US009953537B2

(12) United States Patent
Sim

(10) Patent No.: US 9,953,537 B2
(45) Date of Patent: Apr. 24, 2018

(54) VEHICLE CONTROL SYSTEM AND METHOD THEREOF

(71) Applicant: Mando Corporation, Pyeongtaek-si, Gyeonggi-do (KR)

(72) Inventor: Sang Kyun Sim, Anyang-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 15/336,251

(22) Filed: Oct. 27, 2016

(65) Prior Publication Data

US 2017/0124877 A1 May 4, 2017

(30) Foreign Application Priority Data

Oct. 30, 2015 (KR) ........................ 10-2015-0151953

(51) Int. Cl.
*G08G 1/16* (2006.01)
*B60Q 5/00* (2006.01)
*B60Q 9/00* (2006.01)
*G08G 1/056* (2006.01)
*G06K 9/00* (2006.01)

(52) U.S. Cl.
CPC ............. *G08G 1/166* (2013.01); *B60Q 5/006* (2013.01); *B60Q 9/008* (2013.01); *G06K 9/00791* (2013.01); *G08G 1/056* (2013.01); *G08G 1/167* (2013.01)

(58) Field of Classification Search
CPC ........ G08G 1/161–1/163; G08G 1/166; G08G 1/167; G08G 1/056; G01S 13/931; G05D 1/0246; G06K 9/00791; B60Q 5/006; B60Q 9/008
USPC ........ 340/903, 905, 937, 435; 701/300, 301; 348/148, 149
See application file for complete search history.

(56) References Cited

U.S. PATENT DOCUMENTS

2007/0021915 A1\* 1/2007 Breed ................... G08G 1/167
701/301
2015/0161881 A1\* 6/2015 Takemura .......... G06K 9/00791
348/148

\* cited by examiner

*Primary Examiner* — Thomas Mullen
(74) *Attorney, Agent, or Firm* — McDermott Will & Emery LLP

(57) ABSTRACT

The present invention relates to a vehicle control system and a method thereof. A vehicle control system, according to the present invention, may include: a camera that is configured to photograph a front image; a tire detecting unit that is configured to detect the tire of a nearby vehicle from the image and to measure the direction of the tire; and a controller that is configured to estimate the path of the nearby vehicle based on the direction of the tire, to determine a risk of collision between a driver's vehicle and the nearby vehicle based on the path of the nearby vehicle, and to give a warning or control the driver's vehicle when there is a risk of collision.

20 Claims, 7 Drawing Sheets

VEHICLE CONTROL SYSTEM AND METHOD THEREOF

CROSS REFERENCE TO RELATED APPLICATION

This application claims priority from Korean Patent Application No. 10-2015-0151953, filed on Oct. 30, 2015, which is hereby incorporated by reference for all purposes as if fully set forth herein.

BACKGROUND OF THE INVENTION

1. Field of the Invention

The present invention relates to a vehicle control system and a method thereof.

2. Description of the Prior Art

Vehicle crashes may be significantly dangerous to people or vehicles. The use of intelligent vehicles is increasing to avoid vehicle crashes.

The intelligent vehicle may warn the driver of the risk of an accident in advance, or may automatically perform an operation to avoid the accident in order to thereby prevent or avoid the accident. The intelligent vehicle may control the speed and steering of the vehicle automatically or semi-automatically in a specific situation for the convenience of the driver.

In order to prevent a collision of vehicles, the intelligent vehicle may determine whether or not other vehicles are on the traveling path of the driver's vehicle. For example, when the driver's vehicle changes lanes, the intelligent vehicle may give a warning or may perform an operation to avoid a collision if other vehicles are on the traveling path of the vehicle.

However, whether there will be a collision of vehicles is required to be determined by considering the movement of other vehicles as well as the movement of the driver's vehicle. For example, there may be a possibility of a collision between the driver's vehicle and another vehicle when another vehicle cuts in front of the driver's vehicle while the driver's vehicle keeps its lane. However, current anti-collision systems cannot determine the risk of collision in consideration of the movement of other vehicles.

SUMMARY OF THE INVENTION

The present invention has been made in order to overcome the problems described above. The object of the present invention is to provide a system and a method for avoiding a risk of collision in consideration of the travelling of other vehicles.

An embodiment of the present invention provides a vehicle control system that may include: a camera that is configured to photograph a front image; a tire detecting unit that is configured to detect the tire of a nearby vehicle from the image and to measure the direction of the tire; and a controller that is configured to estimate the path of the nearby vehicle based on the direction of the tire, to determine a risk of collision between a driver's vehicle and the nearby vehicle based on the path of the nearby vehicle, and to give a warning or control the driver's vehicle when there is a risk of collision.

Another embodiment of the present invention provides a vehicle control method that is performed in a vehicle control system including a camera, a tire detecting unit, and a controller, which may include: photographing a front image by the camera; detecting the tire of a nearby vehicle from the image by the tire detecting unit; measuring the direction of the tire by the tire detecting unit; estimating the path of the nearby vehicle based on the direction of the tire by the controller; determining a risk of collision between a driver's vehicle and the nearby vehicle based on the path of the nearby vehicle by the controller; and giving a warning by the controller when there is a risk of collision.

Another embodiment of the present invention provides a vehicle control method that is performed in a vehicle control system including a camera, a tire detecting unit, and a controller, which may include: photographing a front image by the camera; detecting the tire of a nearby vehicle from the image by the tire detecting unit; measuring the direction of the tire by the tire detecting unit; estimating the path of the nearby vehicle based on the direction of the tire by the controller; determining a risk of collision between a driver's vehicle and the nearby vehicle based on the path of the nearby vehicle by the controller; and controlling the driver's vehicle to avoid collision by the controller when there is a risk of collision.

The present invention described above may detect the tire direction of a nearby vehicle, and may determine a risk of collision between the driver's vehicle and the nearby vehicle according to the tire direction in order to thereby give a warning or make a collision-avoidance control, according to the risk of collision.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
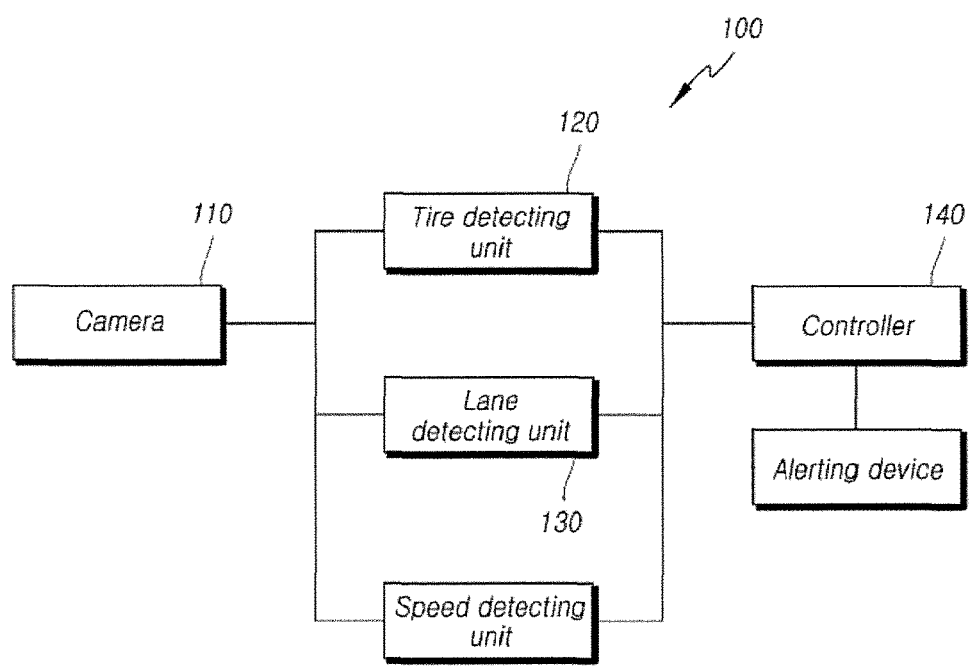
FIG. 1 is a configuration diagram of a vehicle control system, according to an embodiment of the present invention.

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may be connected to", "be coupled to", or "be in contact with" the structural elements as well as that the certain structural element is directly connected to or is in direct contact with another structural element.

In the present specification, the distance may refer to the distance to a detected tire, and the lateral/longitudinal distance may refer to the lateral/longitudinal distance to the tire.

FIG. 1 is a configuration diagram of a vehicle control system, according to an embodiment of the present invention.

Referring to FIG. 1, a vehicle control system 100, according to the embodiment of the present invention, may include: a front camera 110 that photographs a front image; a tire detecting unit 120 that detects tires of a nearby vehicle from the photographed image; a lane detecting unit 130 that detects the lane on which the driver's vehicle travels from the image photographed by the front camera 110; and a controller 140.

The front camera 110 may photograph an image in front of the driver's vehicle. Information of the photographed image may be transferred to the tire detecting unit 120 and/or the lane detecting unit 130.

The tire detecting unit 120 may detect the tire of a nearby vehicle that is positioned in the left or right front side from the image that is photographed by the front camera 110, and may measure the direction of the detected tire. More specifically, the tire detecting unit 120 may recognize a nearby vehicle in order to thereby recognize a tire candidate region. After recognizing the tire candidate region, the tire detecting unit 120 may detect tires based on circular recognition or based on tire pattern recognition. Furthermore, the tire detecting unit 120 may measure the direction of the tire by using the distance of each of one or more detected tires.

The lane detecting unit 130 may detect the lane of the path on which the driver's vehicle travels from the image that is photographed by the front camera 110.

The controller 140 may estimate the traveling path of the nearby vehicle based on the tire direction that is measured by the tire detecting unit 120. In addition, the controller 140 may determine a risk of collision between the driver's vehicle and the nearby vehicle based on the traveling path of the driver's vehicle and the traveling path of the nearby vehicle.

More specifically, if the traveling path of the nearby vehicle leads to the traveling path of the driver's vehicle and if the tire distance of the nearby vehicle is less than a predetermined threshold distance, the controller 140 may determine that there is a risk of collision between the driver's vehicle and the nearby vehicle.

If there is a risk of collision, the controller 140 may give a warning, or may control the driver's vehicle in order to avoid the collision. The warning of a risk of collision may be provided to the driver of the driver's vehicle. Alternatively, the warning may be made by means of an automatic horn to alert the driver of the nearby vehicle. The control of the driver's vehicle may include a braking control to reduce the speed of the driver's vehicle to avoid a collision or a steering control to direct the driver's vehicle in the opposite direction of the nearby vehicle that causes a risk of collision.

Meanwhile, the vehicle control system, according to an embodiment of the present invention, may further include a speed detecting unit that detects the speed of the driver's vehicle and the speed of the nearby vehicle.

Thus, if the speed of the nearby vehicle is greater than zero and is less than the speed of the driver's vehicle when there is a risk of collision, the controller 140 may make a vehicle steering control to direct the driver's vehicle in the opposite direction of the nearby vehicle, and may make an acceleration control to increase the speed of the driver's vehicle. Here, the acceleration control may be intended to allow the driver's vehicle to pass the estimated collision point earlier than the nearby vehicle, thereby avoiding the risk of collision.

Alternatively, if the speed of the nearby vehicle is greater than the speed of the driver's vehicle when there is a risk of collision, the controller 140 may make a vehicle steering control to direct the driver's vehicle in the opposite direction of the nearby vehicle, and may make a deceleration control to reduce the speed of the driver's vehicle. Here, the deceleration control may be intended to allow the driver's vehicle to pass the estimated collision point later than the nearby vehicle, thereby avoiding the risk of collision.

Meanwhile, the vehicle control system, according to an embodiment of the present invention, may further include a speed detecting unit for detecting the speed of the nearby vehicle.

Thus, the controller 140 may: determine the intersection based on the path of the nearby vehicle; determine a risk of collision with the nearby vehicle based on the speed of the nearby vehicle; and make a deceleration control to reduce the speed of the driver's vehicle when there is a risk of collision. Here, if the path of the nearby vehicle is estimated to correspond to the lateral direction, the controller 140 may determine that there is an intersection. Even though the path of the nearby vehicle has a longitudinal component, which is less than a constant value, the controller 140 may determine that there is an intersection by reflecting an error.

Furthermore, if the speed of the nearby vehicle exceeds a predetermined threshold speed, the controller 140 may make a deceleration control to reduce the speed of the driver's vehicle, and may make a vehicle steering control to direct the driver's vehicle in the opposite direction of the nearby vehicle. Here, the deceleration control and the vehicle steering control are intended to move the driver's vehicle rearward of the nearby vehicle in order to avoid a collision because it is difficult to avoid a collision by only the deceleration control.

Meanwhile, the vehicle control system, according to an embodiment of the present invention, may further include a lane detecting unit for detecting the lane on which the driver's vehicle travels from the photographed image. Thus, the controller 140 may determine a risk of collision between the driver's vehicle and the nearby vehicle based on the detected lane and the path of the nearby vehicle, which will be described later with reference to FIG. 3.

Figure 2:
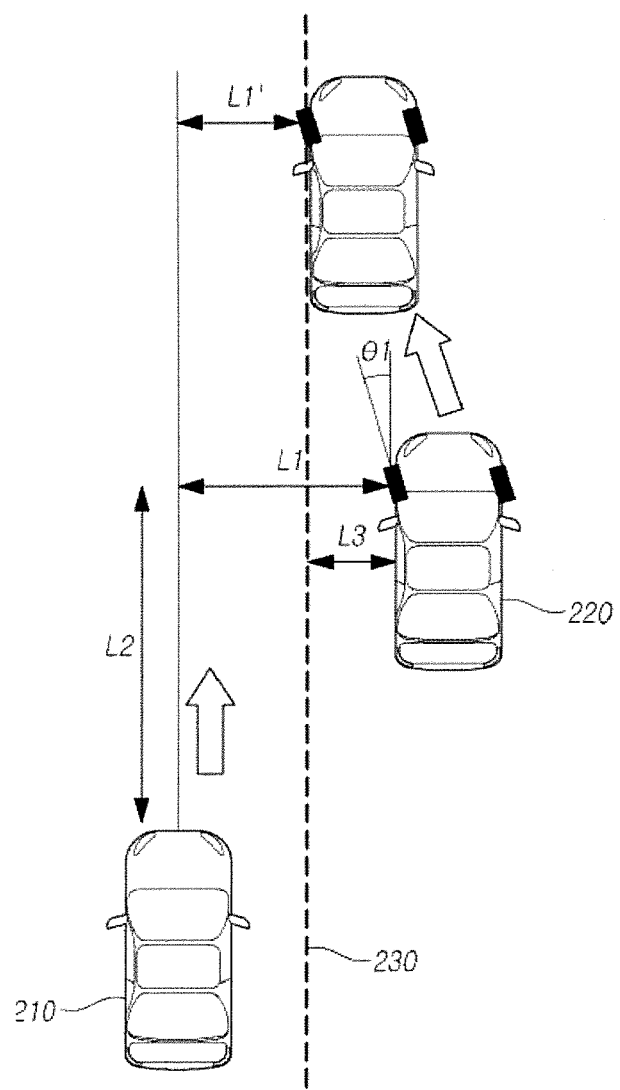
FIG. 2 illustrates an example to which the embodiment of the present invention is applied.

FIG. 2 illustrates an example for determining a risk of collision between the driver's vehicle and the nearby vehicle, according to the present invention.

Referring to FIG. 2, L1 represents the lateral distance between the driver's vehicle 210 and the nearby vehicle 220, and L2 represents the longitudinal distance therebetween. At this time, the lateral distance (L1) and the longitudinal distance (L2) may be measured based on the front center of the driver's vehicle 210 in which a camera is installed and based on the front tire of the nearby vehicle, which is close to the driver's vehicle.

The controller 140 may determine whether or not the longitudinal distance (L2) is less than the first predetermined threshold distance (X) (L2<X). If the longitudinal distance (L2) is not less than the first threshold distance (X), the controller 140 may determine that the possibility of collision between the driver's vehicle 210 and the nearby vehicle 220 is low.

If the longitudinal distance (L2) is less than the first threshold distance (X), the controller 140 may determine whether or not the lateral distance (L1) is greater than zero and is less than the second predetermined threshold distance (Y) (0<L1<Y). If the lateral distance (L1) is greater than zero and is less than the second threshold distance (Y), the controller 140 may make an LKAS (Lane Keeping Assist System) steering control. More specifically, the controller 140 may make a lateral control to direct the driver's vehicle 210 in the opposite direction of the nearby vehicle 220.

If the lateral distance (L1) is not greater than zero or is not less than the second threshold distance (Y), the controller 140 may determine whether or not the lateral distance (L1) is less than zero (L1<0). The case where the lateral distance (L1) is less than zero corresponds to the case where the driver's vehicle 210 may collide with the nearby vehicle 220. When the lateral distance (L1) is less than zero, the controller 140 may detect a CIPV (Closest In Path Vehicle) that refers to a vehicle that is closest to the driver's vehicle. If the CIPV is not detected, the controller 140 may make a control to: operate an automatic horn to warn the nearby vehicle 220; give a warning of the risk of collision to the driver; or reduce the speed of the driver's vehicle 210. If the CIPV is detected, the controller 140 may perform the automatic emergency brake.

Meanwhile, if the lateral distance (L1) is greater than the second threshold distance (Y), the controller 140 may determine that the possibility of collision between the driver's vehicle 210 and the nearby vehicle 220 is low.

In the above-described example, the controller 140 may determine a risk of collision based on the current positions of the driver's vehicle 210 and the nearby vehicle 220. As another example, the controller 140 may determine the estimated path of the nearby vehicle 220 after a predetermined time based on the travelling direction of the nearby vehicle 220, and may determine a risk of collision between the driver's vehicle 210 and the nearby vehicle 220 based on the same.

In FIG. 2, the tire of the nearby vehicle 220 is at an angle of θ1 with the travelling direction of the driver's vehicle 210. The tire angle of the nearby vehicle 220 indicates the travelling path of the nearby vehicle 220. The tire detecting unit 120 may detect one or more tires of the nearby vehicle 220, and may measure the tire angle by using the distance of each of the one or more detected tire. More specifically, the tire angle (θ1) of the nearby vehicle 220 may be measured by means of the inverse tangent $$\left(\tan^{-1}\frac{dL2}{dL1}\right)$$

of a value that is obtained by dividing the longitudinal distance (dL2) of the front wheel and the rear wheel of the nearby vehicle 220 by the lateral distance (dL1) of the front wheel and the rear wheel of the nearby vehicle 220. Here, the longitudinal distance (dL2) of the front wheel and the rear wheel may be detected by subtracting the longitudinal distance (L2r) of the rear wheel from the longitudinal distance (L2f) of the front wheel, and the lateral distance (dL1) may be detected by subtracting the lateral distance (L1r) of the rear wheel from the lateral distance (L1f) of the front wheel. Here, although the tire angle is calculated by means of the front wheel and the rear wheel, it is not limited thereto, and it may be calculated by using the distances of other wheels of the nearby vehicle 220, which have different longitudinal components.

Alternatively, the tire angle may be calculated by using the distance of a single wheel according to the movement thereof. That is, the tire angle may be calculated by using the distance of the front wheel at the first time and the distance of the front wheel at the second time after the lapse of a specific time.

Furthermore, the controller 140 may estimate the position of the nearby vehicle 220 after a constant time (t) based on the tire angle (θ1).

The constant time (t) may refer to the time that is taken for the driver's vehicle 210 to proceed by the longitudinal distance (L2). When the speed of the driver's vehicle 210 is V1, the time (t) may be calculated by L2/V1. Alternatively, the constant time (t) may refer to the time that is taken for the driver's vehicle 210 to make a close approach to the nearby vehicle 220 based on the relative speed of the driver's vehicle 210 with respect to the nearby vehicle 220. When the speed of the driver's vehicle 210 is V1 and the speed of the nearby vehicle 220 is V2, the time (t) may be calculated by L2/(V1−V2).

The controller 140 may calculate the lateral distance (L1') between the driver's vehicle 210 and the nearby vehicle 220 after the lapse of time (t). For example, the lateral distance (L1') after the lapse of time (t) may be calculated by applying the speed of the nearby vehicle 220, time (t), and the tire angle (θ1) of the nearby vehicle 220 before the lapse of time (t) to the trigonometrical function. Thereafter, the controller 140 may determine a risk of collision between the driver's vehicle 210 and the nearby vehicle 220 based on the value L1'.

Although the controller 140 has determined the possibility of collision based on the lateral distance between the driver's vehicle 210 and the nearby vehicle 220 in the example described above, the controller 140 may determine the possibility of collision based on the lateral distance between the lane on which the driver's vehicle 210 travels and the nearby vehicle 220.

The controller 140 may determine whether or not the longitudinal distance (L2) is less than the first threshold distance (X) (L2<X). If the longitudinal distance (L2) is not less than the first threshold distance (X), the controller 140 may determine that the possibility of collision between the driver's vehicle 210 and the nearby vehicle 220 is low.

If the longitudinal distance (L2) is less than the first threshold distance (X), the controller 140 may determine whether or not the lateral distance (L3) between the road-surface line 230 and the nearby vehicle 220 is greater than zero and is less than the third threshold distance (Y') (0<L3<Y'). If the lateral distance (L3) is greater than zero and is less than the third threshold distance (Y') (in the case of a positive determination), the controller 140 may make an LKAS (Lane Keeping Assist System) steering control. More specifically, the controller 140 may make a lateral control to direct the driver's vehicle 210 in the opposite direction of the nearby vehicle 220.

On the contrary, in the case of a negative determination, the controller 140 may determine whether or not the lateral distance (L3) is less than zero (L3<0). If the lateral distance (L3) is less than zero, the controller 140 may detect the nearest vehicle on the path (i.e., Closest In-Path Vehicle; CIPV). If no CIPV is detected, the controller 140 may make a control to: operate an automatic horn to warn the nearby vehicle 220; give a warning of the risk of collision to the driver of the driver's vehicle; or reduce the speed of the driver's vehicle 210. If the CIPV is detected, the controller 140 may perform the automatic emergency brake (AEB).

Meanwhile, if the lateral distance (L1) is greater than the second threshold distance (Y), the controller 140 may determine that the possibility of collision between the driver's vehicle 210 and the nearby vehicle 220 is low.

In the above-described example, the controller 140 may determine a risk of collision based on the current positions of the driver's vehicle 210 and the nearby vehicle 220. As another example, the controller 140 may determine the estimated path of the nearby vehicle 220 after a predetermined time based on the travelling direction of the nearby vehicle 220, and may determine a risk of collision between the driver's vehicle 210 and the nearby vehicle 220 based on the same, which will be described in more detail with reference to FIG. 4.

In FIG. 2, the tire of the nearby vehicle 220 is at an angle of θ1 with the travelling direction of the driver's vehicle 210. Thus, the controller 140 may estimate the position of the nearby vehicle 220 after the lapse of a constant time (t) based on the tire angle (θ1).

The constant time (t) may refer to the time that is taken for the driver's vehicle 210 to proceed by the longitudinal distance (L2). When the speed of the driver's vehicle 210 is V1, the time (t) may be calculated by L2/V1. Alternatively, the constant time (t) may refer to the time that is taken for the driver's vehicle 210 to make a close approach to the nearby vehicle 220 based on the relative speed of the driver's vehicle 210 with respect to the nearby vehicle 220. When the speed of the driver's vehicle 210 is V1 and the speed of the nearby vehicle 220 is V2, the time (t) may be calculated by L2/(V1−V2).

The controller 140 may calculate the lateral distance between the road-surface line 230 and the nearby vehicle 220 after the elapse of time (t).

Figure 3:
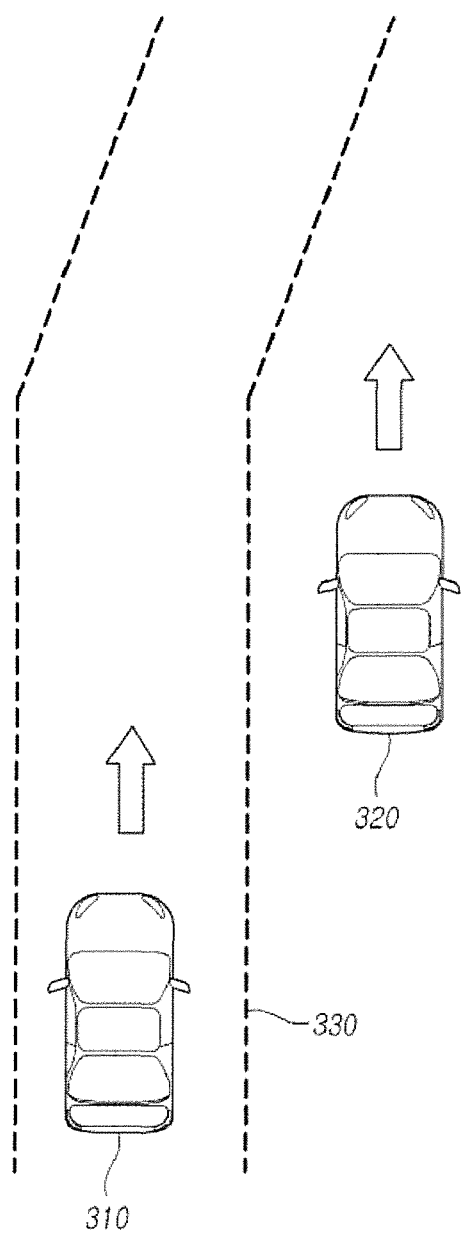
FIG. 3 illustrates another example to which the embodiment of the present invention is applied.

FIG. 3 illustrates another example for determining a risk of collision between the driver's vehicle and the nearby vehicle 220 in the present invention.

In the example of FIG. 3, the driver's vehicle 310 travels in parallel with the nearby vehicle 320. However, since the travelling lane 330 of the driver's vehicle 310 is curved toward the nearby vehicle 320, the nearby vehicle 320 may travel through the travelling lane 330 of the driver's vehicle 310 so that the driver's vehicle 310 may collide with the nearby vehicle 320.

In this case, since the current traveling direction of the driver's vehicle is parallel with the traveling direction of the nearby vehicle, the risk of collision may be determined to be low by considering only the direction of the driver's vehicle and the tire direction of the nearby vehicle. However, there is a possibility of a collision between the driver's vehicle and the nearby vehicle because the nearby vehicle may travel through the lane of the driver's vehicle in the curved region, so it may be preferable to determine the risk of collision based on the lateral distance of the nearby vehicle 320 with respect to the lane. In this case, it is possible to determine the possibility of collision in consideration of the distance of the tire of the nearby vehicle 320 with respect to the curved road-surface line 330 and/or the tire angle of the nearby vehicle 320 with respect to the curved road-surface line 330, which will be described in more detail later with reference to FIG. 5.

Thus, the system may further include a lane detecting unit for detecting the lane in which the driver's vehicle travels from the photographed image.

Figure 4:
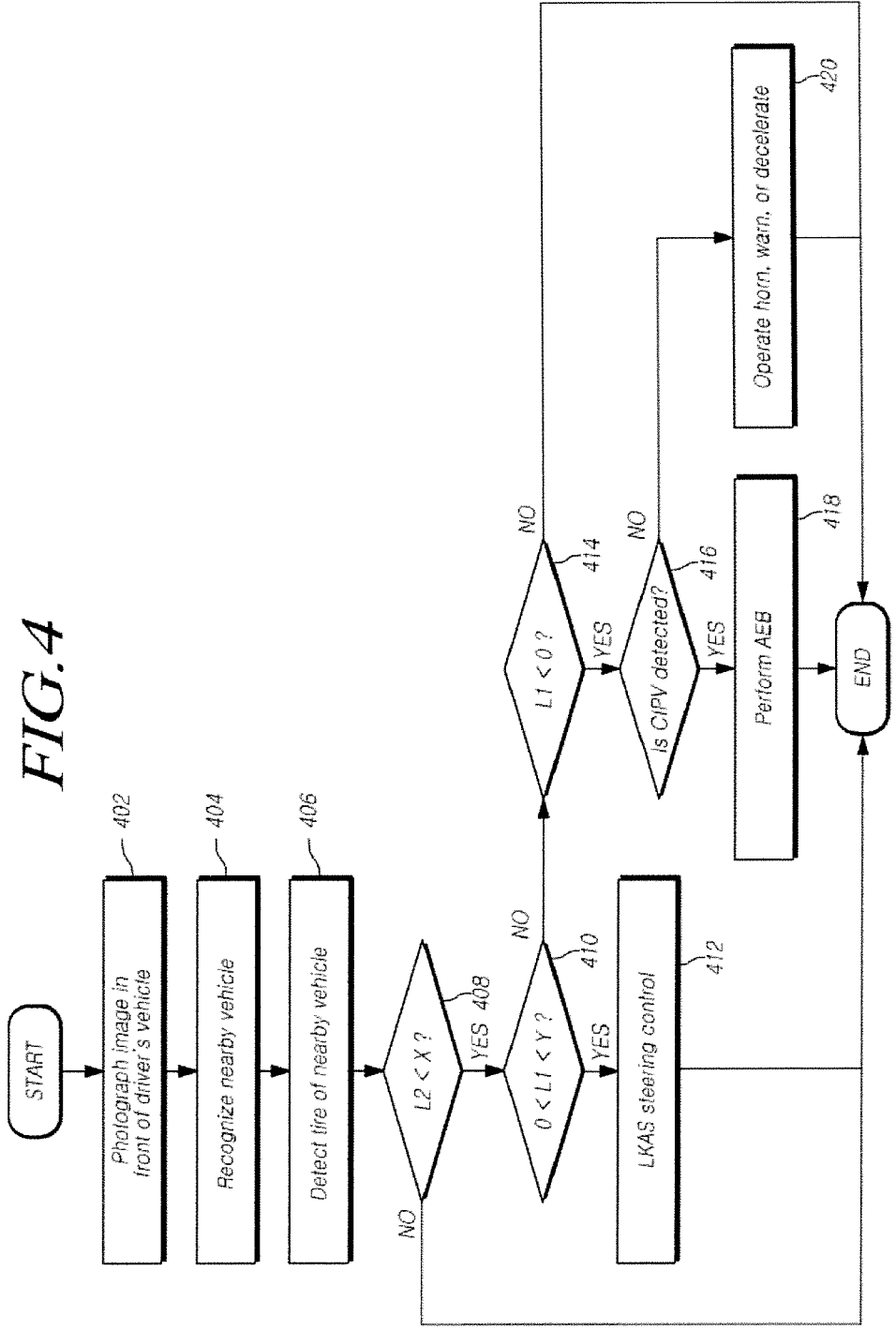
FIG. 4 is a flowchart of a vehicle control method, according to the first embodiment of the present invention.

FIG. 4 is a flowchart of a vehicle control method, according to the first embodiment of the present invention.

Referring to FIG. 4, the front camera 110 may photograph an image in front of the driver's vehicle (S402). The tire detecting unit 120 may recognize the nearby vehicle from the photographed image (S404). In addition, the tire detecting unit 120 may detect a tire of the nearby vehicle by using a tire recognition algorithm (S406).

The controller 140 may determine whether or not the longitudinal distance is less than the first predetermined threshold distance (X) (S408). If the longitudinal distance (L2) is less than the first threshold distance (X) (YES in operation S408), the controller 140 may determine whether or not the lateral distance (L1) between the driver's vehicle and the nearby vehicle is greater than zero and is less than the second predetermined threshold distance (Y) (S410). If the lateral distance (L1) between the driver's vehicle and the nearby vehicle is greater than zero and is less than the second threshold distance (Y) (YES in operation S410 in the case of a positive determination), the controller 140 may make an LKAS (Lane Keeping Assist System) steering control to make a lateral control to direct the driver's vehicle in the opposite direction of the nearby vehicle (S412).

On the contrary, in the case of a negative determination (NO in operation S410), the controller 140 may determine whether or not the lateral distance (L1) is less than zero (S414). If the lateral distance (L1) is less than zero (YES in operation S414), the controller 140 may determine whether or not the CIPV is detected (S416). If the CIPV is detected (YES in operation S416), the controller 140 may make an automatic control (AEB) according to the risk of collision (S418). If the CIPV is not detected (NO in operation S416), the controller 140 may: operate an automatic horn; give a warning of the risk of collision; or reduce the speed of the driver's vehicle (S420).

In the example above, the specific operation of avoiding collision may be different depending on the system of the vehicle. For example, in the case of the vehicle that does not adopt the LKAS system and/or AEB system, the controller 140 may perform only the operation of the automatic horn and/or the warning of the risk of collision regardless of whether or not the lateral distance (L1) between the driver's vehicle and the nearby vehicle is less than zero when the lateral distance (L1) is less than the second threshold distance (Y). That is, the controller 140 may determine only whether or not the lateral distance (L1) is less than the second threshold distance (Y) after operation S408 of FIG. 4, and may perform operation S420 when the lateral distance (L1) is less than the second threshold distance (Y).

Figure 5:
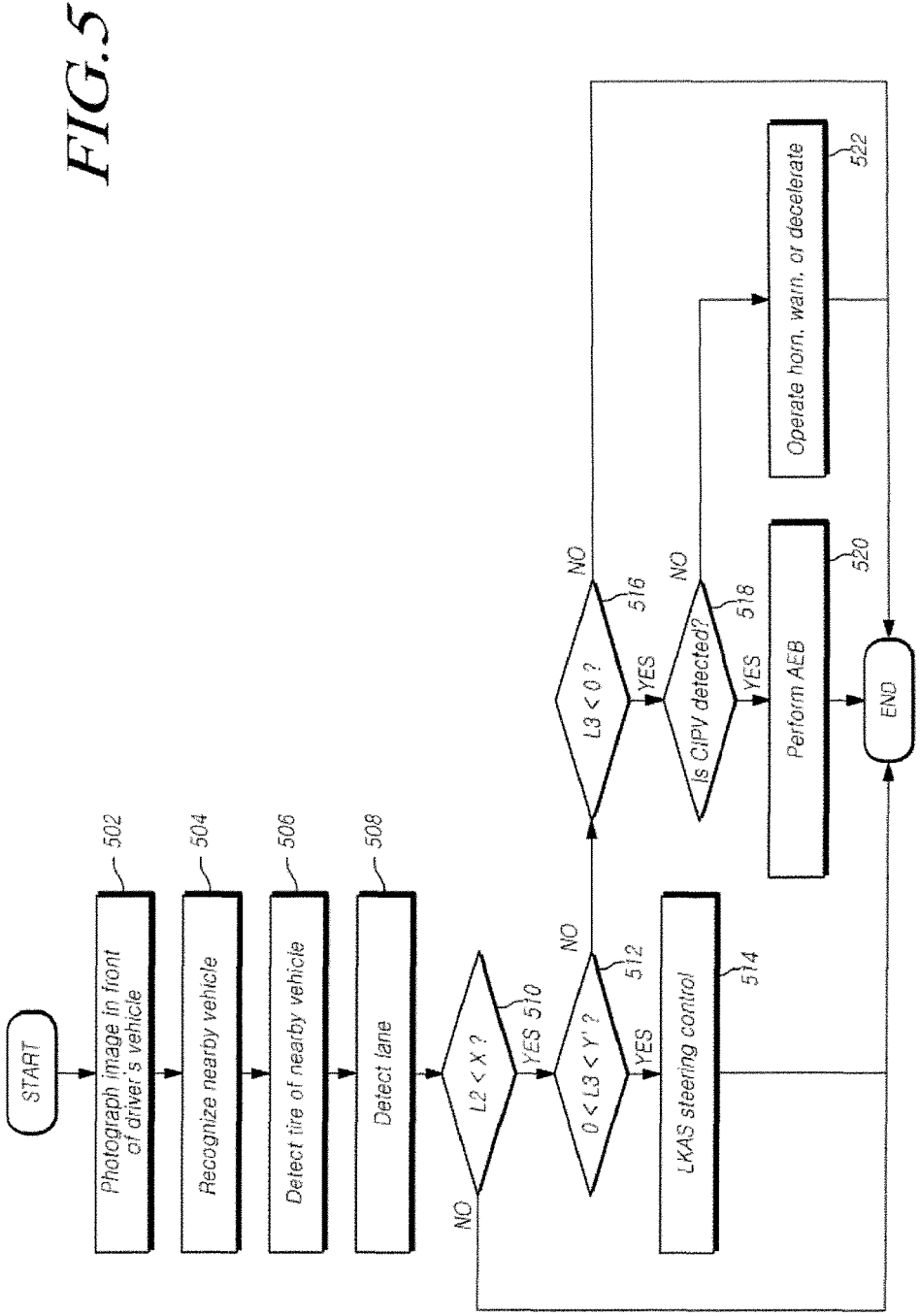
FIG. 5 is a flowchart of a vehicle control method, according to the second embodiment of the present invention.

FIG. 5 is a flowchart of a vehicle control method, according to the second embodiment of the present invention.

Referring to FIG. 5, the front camera 110 may photograph an image in front of the driver's vehicle (S502). The tire detecting unit 120 may recognize the nearby vehicle from the photographed image (S504), and may detect a tire of the nearby vehicle by using a tire recognition algorithm (S506). In addition, the lane detecting unit 130 may recognize the lane in which the driver's vehicle travels from the photographed image (S508).

The controller 140 may determine whether or not the longitudinal distance (L2) between the driver's vehicle and the nearby vehicle is less than the first threshold distance (S510). If the longitudinal distance (L2) is less than the first threshold distance (X) (YES in operation S510), the controller 140 may determine whether or not the lateral distance (L3) between the road-surface line and the nearby vehicle is greater than zero and is less than the third threshold distance (Y') (S512). If the lateral distance (L3) between the road-surface line and the nearby vehicle is greater than zero and is less than the third threshold distance (Y') (YES in operation S512 in the case of a positive determination), the controller 140 may make an LKAS steering control to may make a lateral control to direct the driver's vehicle in the opposite direction of the nearby vehicle (S514).

On the contrary, in the case of a negative determination (NO in operation S512), the controller 140 may determine whether or not the lateral distance is less than zero (S516). If the lateral distance (L3) is less than zero (YES in operation S516), the controller 140 may determine whether or not the CIPV is detected (S518). If the CIPV is detected (YES in operation S518), the controller 140 may make a brake control (AEB) according to the risk of collision (S520). If the CIPV is not detected (NO in operation S520), the controller 140 may: operate an automatic horn; give a warning of the risk of collision; or reduce the speed of the driver's vehicle (S522).

In the example above, the specific operation of avoiding collision may be different depending on the system of the vehicle. For example, in the case of the vehicle that does not adopt the LKAS system and/or AEB system, the controller 140 may perform only the operation of the automatic horn and/or the warning of the risk of collision regardless of whether or not the lateral distance (L3) between the road-surface line and the nearby vehicle is less than zero when the lateral distance (L3) is less than the third threshold distance (Y'). That is, the controller 140 may determine only whether or not the lateral distance (L3) is less than the third threshold distance (Y') after operation S510 of FIG. 5, and may perform operation S522 when the lateral distance (L3) is less than the third threshold distance (Y').

Figure 6:
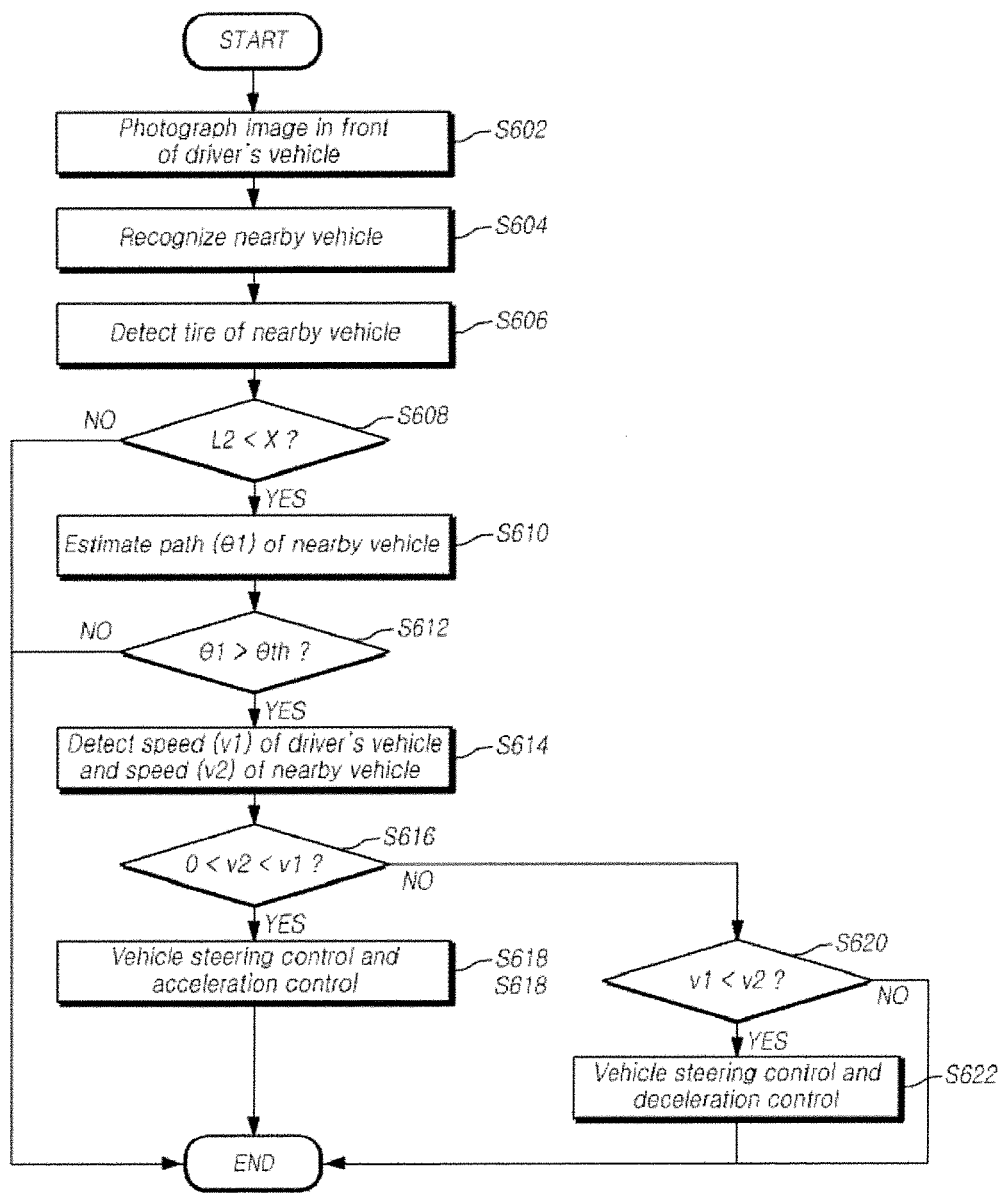
FIG. 6 is a flowchart of a vehicle control method, according to the third embodiment of the present invention.

FIG. 6 is a flowchart of a vehicle control method, according to the third embodiment of the present invention.

Referring to FIG. 6, the front camera 110 may photograph an image in front of the driver's vehicle (S602). The tire detecting unit 120 may recognize the nearby vehicle from the photographed image (S604), and may detect the tire of the nearby vehicle by using a tire recognition algorithm (S606).

The controller 140 may determine whether or not the longitudinal distance (L2) between the driver's vehicle and the nearby vehicle is less than the first threshold distance (S608). If the longitudinal distance (L2) is less than the first threshold distance (X) (YES in operation S608), the controller 140 may estimate the path ($\theta 1$) of the nearby vehicle (S610). In addition, the controller 140 may determine whether or not the path ($\theta 1$) of the nearby vehicle is greater than a predetermined threshold path ($\theta$th) (S612). If the path ($\theta 1$) of the nearby vehicle is greater than a predetermined threshold path ($\theta$th) (YES in operation S612), the speed detecting unit may detect the speed (v1) of the driver's vehicle and the speed (v2) of the nearby vehicle (S614). In addition, the controller 140 may determine whether or not the speed (v2) of the nearby vehicle is greater than zero and is less than the speed (v1) of the driver's vehicle (S616). If the speed (v2) of the nearby vehicle is greater than zero and is less than the speed (v1) of the driver's vehicle (YES in operation S616), the controller 140 may make a steering control to direct the driver's vehicle in the opposite direction of the nearby vehicle and may make an acceleration control (S618). This may be intended to allow the driver's vehicle to pass the estimated collision point earlier than the nearby vehicle in order to thereby avoid a collision.

If the speed (v2) of the nearby vehicle is greater than zero and is not less than the speed (v1) of the driver's vehicle (NO in operation S616), the controller 140 may determine whether or not the speed (v2) of the nearby vehicle is greater than the speed (v1) of the driver's vehicle (S620). If the speed (v2) of the nearby vehicle is greater than the speed (v1) of the driver's vehicle (YES in operation S620), the controller may make a steering control to direct the driver's vehicle in the opposite direction of the nearby vehicle and may make a deceleration control (S622). This may be intended to allow the driver's vehicle to pass the estimated collision point later than the nearby vehicle in order to thereby avoid a collision.

Figure 7:
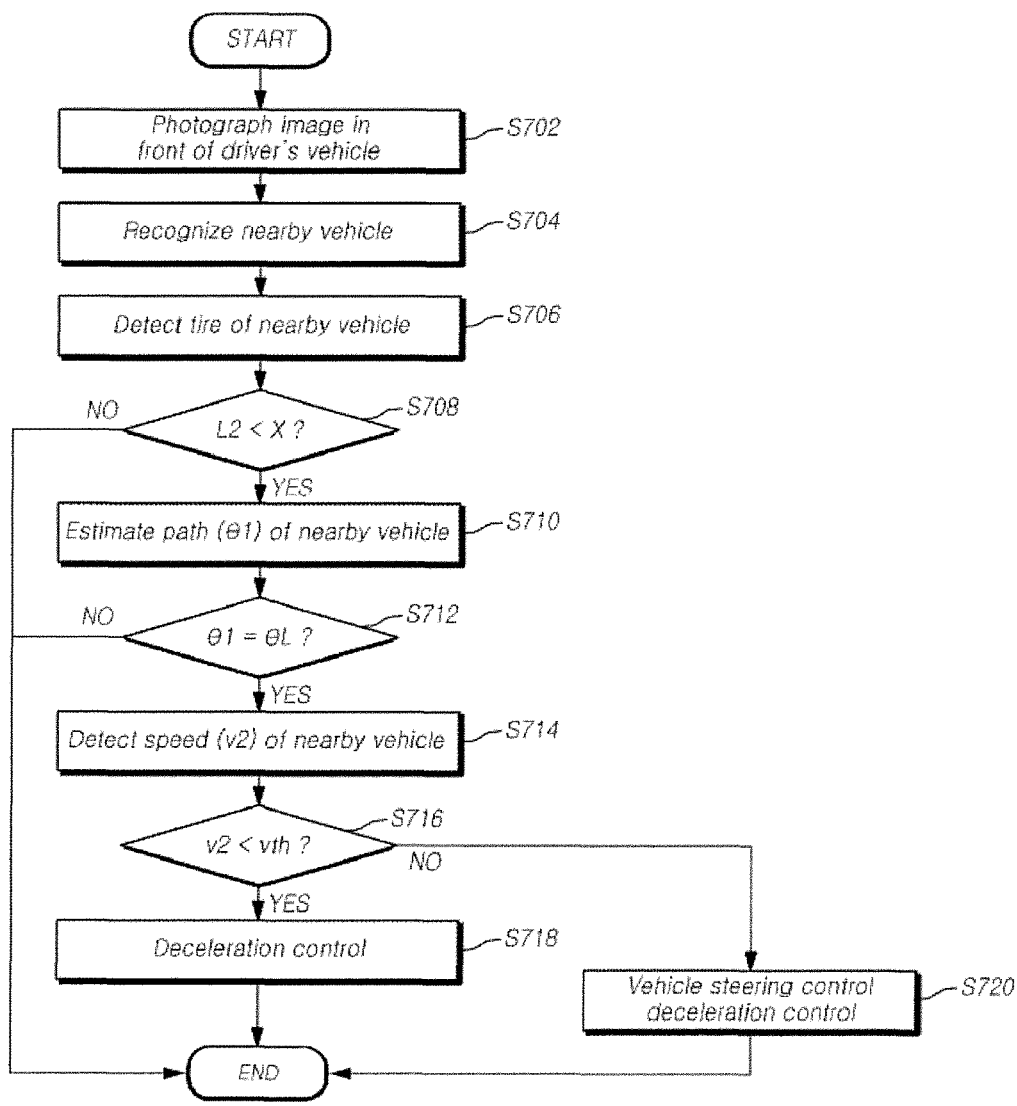
FIG. 7 is a flowchart of a vehicle control method, according to the fourth embodiment of the present invention.

FIG. 7 is a flowchart of a vehicle control method, according to the fourth embodiment of the present invention.

Referring to FIG. 7, the front camera 110 may photograph an image in front of the driver's vehicle (S702). The tire detecting unit 120 may recognize the nearby vehicle from the photographed image (S704), and may detect the tire of the nearby vehicle by using a tire recognition algorithm (S706).

The controller 140 may determine whether or not the longitudinal distance (L2) between the driver's vehicle and the nearby vehicle is less than the first threshold distance (X) (S708). If the longitudinal distance (L2) is less than the first threshold distance (X) (YES in operation S708), the controller 140 may estimate the path ($\theta 1$) of the nearby vehicle (S710). In addition, the controller 140 may determine whether or not the path ($\theta 1$) of the nearby vehicle is equal to a predetermined the intersection path ($\theta L$) (S712). If the path ($\theta 1$) of the nearby vehicle is equal to a predetermined the intersection path ($\theta L$) (YES in operation S712), the speed detecting unit may detect the speed (v2) of the nearby vehicle (S714). In addition, the controller 140 may determine whether or not the speed (v2) of the nearby vehicle is less than a predetermined threshold speed (vth) (S716). If the speed (v2) of the nearby vehicle is less than the predetermined threshold speed (vth) (YES in operation S716), the controller 130 may make a deceleration control (S718).

If the speed (v2) of the nearby vehicle is not less than the predetermined threshold speed (vth) (NO in operation S716), the controller may make a steering control to direct the driver's vehicle in the opposite direction of the nearby vehicle and may make a deceleration control (S720).

The embodiments described above with reference to FIGS. 4 and 5 may: make an LKAS control; perform the AEB; operate a horn; give a warning of collision; or reduce the speed of the vehicle. However, the present invention is not limited thereto. For example, although the LKAS steering control, the performance of the AEB, the operation of the horn, the warning of a risk of collision, and the reduction in the speed of the vehicle are separately described in the embodiments of FIGS. 4 and 5, the detailed control operation may vary. That is, one or more of the LKAS steering control, the performance of the AEB, the operation of the horn, the warning of a risk of collision, or the reduction in the speed of the vehicle may be performed at the same time under a specific condition. For example, the controller 140 may make a steering control and a brake control at the same time, and may then perform the operation of a horn and the generation of a warning signal.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention. Although a preferred embodiment of the present invention has been described for illustrative purposes, those skilled in the art will appreciate that various modifications, additions and substitutions are possible, without departing from the scope and spirit of the invention as disclosed in the accompanying claims. The scope of the present invention shall be construed on the basis of the accompanying claims in such a manner that all of the technical ideas included within the scope equivalent to the claims belong to the present invention.

What is claimed is:

1. A vehicle control system for a vehicle of a user comprising:
    a camera configured to photograph an image in front of the vehicle;
    a tire detecting unit configured to detect a tire of multiple tires of a nearby vehicle from the image and to measure a direction of the tire; and
    a controller configured to estimate a traveling path of the nearby vehicle based on the direction of the tire, to determine a risk of collision between the vehicle and the nearby vehicle based on the traveling path of the nearby vehicle, and to give a warning or control the vehicle when there is a risk of collision.

2. The system according to claim 1, wherein the warning is given to the user via an alerting device.

3. The system according to claim 1, wherein the warning is given to the nearby vehicle via an alerting device.

4. The system according to claim 1, wherein the control is at least one of a vehicle braking control or a vehicle steering control.

5. The system according to claim 1, wherein the tire detecting unit detects the tire of the nearby vehicle and measures the direction of the tire by using a lateral distance of the tire at a first time and a lateral distance of the tire at a second time after a lapse of a specified time.

6. The system according to claim 1, wherein the controller determines that there is a risk of collision between the vehicle and the nearby vehicle if the traveling path of the nearby vehicle leads to a traveling path of the vehicle and if a lateral distance of the tire of the nearby vehicle is less than a predetermined threshold distance.

7. The system according to claim 1, further comprising a speed detecting unit configured to detect a speed of the vehicle and a speed of the nearby vehicle, wherein the controller implements a vehicle steering control to direct the vehicle in an opposite direction of the nearby vehicle, and accelerates the vehicle if the speed of the nearby vehicle is greater than zero and is less than the speed of the vehicle when there is a risk of collision.

8. The system according to claim 1, further comprising a speed detecting unit configured to detect a speed of the vehicle and a speed of the nearby vehicle, wherein the controller implements a vehicle steering control to direct the vehicle in an opposite direction of the nearby vehicle, and decelerates the vehicle if the speed of the nearby vehicle is greater than the speed of the vehicle when there is a risk of collision.

9. The system according to claim 1, further comprising a speed detecting unit configured to detect the speed of the vehicle and the speed of the nearby vehicle, wherein the controller: determines a collision location based on the traveling path of the nearby vehicle; determines a risk of collision between the vehicle and the nearby vehicle based on the speed of the nearby vehicle; and decelerates the vehicle to reduce the speed of the vehicle when there is a risk of collision.

10. The system according to claim 9, wherein the controller decelerates the vehicle and implements a vehicle steering control to direct the vehicle in an opposite direction of the nearby vehicle if the speed of the nearby vehicle exceeds a predetermined threshold speed.

11. The system according to claim 1, further comprising a lane detecting unit configured to detect a lane in which the vehicle travels from the image, wherein the controller determines a risk of collision between the vehicle and the nearby vehicle based on the lane and the traveling path of the nearby vehicle.

12. A vehicle control method that is performed in a vehicle control system including a camera, a tire detecting unit, and a controller for a vehicle of a user, the method comprising:
    photographing, by the camera, an image in front of the vehicle;
    detecting, by the tire detecting unit, a tire of multiple tires of a nearby vehicle from the image;
    measuring, by the tire detecting unit, a direction of the tire;
    estimating, by the controller, a traveling path of the nearby vehicle based on the direction of the tire;
    determining, by the controller, a risk of collision between the vehicle and the nearby vehicle based on the traveling path of the nearby vehicle; and
    giving, by the controller, a warning when there is a risk of collision.

13. The method according to claim 12, wherein the direction of the detected tire of the nearby vehicle is measured by using a lateral distance of the tire at a first time and a lateral distance of the tire at a second time after a lapse of a specified time.

14. The method according to claim 12, wherein the vehicle and the nearby vehicle are determined to have a risk of collision therebetween if the traveling path of the nearby vehicle leads to a traveling path of the vehicle and if a lateral distance of the tire of the nearby vehicle is less than a predetermined threshold distance.

15. The method according to claim 12, further comprising detecting a lane in which the vehicle travels from the image, wherein a risk of collision between the vehicle and the nearby vehicle is determined based on the lane and the traveling path of the nearby vehicle.

16. A vehicle control method that is performed in a vehicle control system including a camera, a tire detecting unit, and a controller for a vehicle of a user, the method comprising:
    photographing, by the camera, an image in front of the vehicle;
    detecting a tire of multiple tires of a nearby vehicle from the image by the tire detecting unit;
    measuring a direction of the tire by the tire detecting unit;
    estimating a traveling path of the nearby vehicle based on the direction of the tire by the controller;
    determining a risk of collision between the vehicle and the nearby vehicle based on the traveling path of the nearby vehicle by the controller; and
    controlling the vehicle to avoid a collision by the controller when there is a risk of collision.

17. The method according to claim 16, wherein the control is at least one of a vehicle braking control or a vehicle steering control.

18. The method according to claim 16, further comprising detecting a speed of the vehicle and a speed of the nearby vehicle, wherein the controlling of the vehicle comprises implementing a vehicle steering control to direct the vehicle in an opposite direction of the nearby vehicle and accelerating the vehicle if the speed of the nearby vehicle is greater than zero and is less than the speed of the vehicle when there is a risk of collision.

19. The method according to claim 16, further comprising detecting a speed of the vehicle and a speed of the nearby vehicle, wherein the controlling of the vehicle comprises implementing a vehicle steering control to direct the vehicle in an opposite direction of the nearby vehicle and decelerating the vehicle if the speed of the nearby vehicle is greater than the speed of the vehicle when there is a risk of collision.

20. The method according to claim 16, further comprising detecting a speed of the nearby vehicle, wherein the controlling of the vehicle comprises: determining a collision location based on the traveling path of the nearby vehicle; determining a risk of collision between the vehicle and the nearby vehicle based on the speed of the nearby vehicle; and decelerating the vehicle to reduce a speed of the vehicle when there is a risk of collision.

\* \* \* \* \*